United States Patent
Mollov et al.

(10) Patent No.: US 7,589,326 B2
(45) Date of Patent: Sep. 15, 2009

(54) SYSTEMS AND METHODS FOR IMAGE ACQUISITION

(75) Inventors: Ivan Mollov, Cupertino, CA (US); Richard E. Colbeth, Los Altos, CA (US); Pieter Gerhard Roos, Mountain View, CA (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 254 days.

(21) Appl. No.: 11/439,067

(22) Filed: May 22, 2006

(65) Prior Publication Data

US 2007/0001119 A1 Jan. 4, 2007

Related U.S. Application Data

(63) Continuation-in-part of application No. 10/687,552, filed on Oct. 15, 2003, now Pat. No. 7,095,028.

(51) Int. Cl.
*G01T 1/20* (2006.01)
(52) U.S. Cl. .................................. 250/370.14
(58) Field of Classification Search ............. 250/370.14
See application file for complete search history.

(56) References Cited

U.S. PATENT DOCUMENTS

| | | |
|---|---|---|
| 4,191,856 A | 3/1980 | Nagano et al. |
| 4,216,435 A | 8/1980 | Ahmed |
| 4,220,873 A | 9/1980 | Giordano |
| 4,366,522 A | 12/1982 | Baker |
| 4,572,967 A | 2/1986 | Metz |
| 4,596,958 A | 6/1986 | Graeme et al. |
| 4,672,454 A | 6/1987 | Cannella et al. |
| 4,727,506 A | 2/1988 | Fling |
| 4,740,722 A | 4/1988 | Furuhata |
| 4,746,814 A | 5/1988 | Shigekane |
| 4,804,863 A | 2/1989 | Welland et al. |
| 5,130,567 A | 7/1992 | Rutten et al. |
| 5,130,798 A | 7/1992 | Christopher |

(Continued)

FOREIGN PATENT DOCUMENTS

EP 0159654 B1 1/1991

(Continued)

OTHER PUBLICATIONS

Boyer, A.L. et al. A Review of Electronic Portal Imaging Devices (EPIDS) Med. Phys. (Jan./Feb. 1992) 19(1):1-16.

(Continued)

*Primary Examiner*—David P Porta
*Assistant Examiner*—Marcus H Taningco
(74) *Attorney, Agent, or Firm*—Vista IP Law Group, LLP.

(57) ABSTRACT

An imaging system includes a first image element in a first row, a second image element in the first row, a third image element in a second row, the third image element and the first image element being in a first column, a gate driver, a first electrical line extending from the gate driver, wherein the first and the second image elements are connected to the first electrical line, a second electrical line, wherein the first image element is connected to the second electrical line, and a third electrical line, wherein the third image element is connected to the third electrical line.

43 Claims, 9 Drawing Sheets

U.S. PATENT DOCUMENTS

| | | |
|---|---|---|
| 5,148,121 A | 9/1992 | Uchida |
| 5,159,341 A | 10/1992 | McCartney et al. |
| 5,170,115 A | 12/1992 | Kashiwabara et al. |
| 5,184,018 A | 2/1993 | Conrads et al. |
| 5,262,649 A | 11/1993 | Antonuk et al. |
| 5,304,853 A | 4/1994 | Choi |
| 5,331,222 A | 7/1994 | Lin et al. |
| 5,352,987 A | 10/1994 | Harvey |
| 5,355,035 A | 10/1994 | Vora et al. |
| 5,363,055 A | 11/1994 | Ribner |
| 5,400,083 A | 3/1995 | Mizusawa |
| 5,430,400 A | 7/1995 | Herlein et al. |
| 5,442,407 A | 8/1995 | Lu |
| 5,459,320 A | 10/1995 | Danet et al. |
| 5,465,284 A | 11/1995 | Karellas |
| 5,489,910 A | 2/1996 | Kuwata et al. |
| 5,506,880 A | 4/1996 | Scardino et al. |
| 5,508,751 A | 4/1996 | Nitta |
| 5,576,646 A | 11/1996 | Rezzi et al. |
| 5,581,274 A | 12/1996 | Tagawa |
| 5,589,847 A | 12/1996 | Lewis |
| 5,657,400 A | 8/1997 | Granfors et al. |
| 5,689,197 A | 11/1997 | Sugawara |
| 5,717,457 A | 2/1998 | Morimoto |
| 5,739,803 A | 4/1998 | Neugebauer |
| 5,801,571 A | 9/1998 | Allen et al. |
| 5,864,146 A | 1/1999 | Karellas |
| 5,872,470 A | 2/1999 | Mallinson et al. |
| 5,953,060 A | 9/1999 | Dierickx |
| 5,970,115 A | 10/1999 | Colbeth et al. |
| 6,084,461 A | 7/2000 | Colbeth et al. |
| 6,118,438 A | 9/2000 | Ho |
| 6,259,489 B1 | 7/2001 | Flannaghan et al. |
| 6,310,567 B1 | 10/2001 | Copley et al. |
| 6,331,844 B1 | 12/2001 | Okumura et al. |
| RE37,536 E | 2/2002 | Barnes |
| 6,359,607 B1 | 3/2002 | Yanagi et al. |
| 6,424,750 B1 | 7/2002 | Colbeth et al. |
| 6,445,764 B2 | 9/2002 | Gohno et al. |
| 6,469,740 B1 | 10/2002 | Kuroda et al. |
| 6,486,808 B1 | 11/2002 | Seppi et al. |
| 6,535,254 B1 | 3/2003 | Olsson et al. |
| 6,587,142 B1 | 7/2003 | Kozlowski et al. |
| 6,653,992 B1 | 11/2003 | Colbeth et al. |
| 6,718,069 B2 | 4/2004 | Mollov et al. |
| 6,744,912 B2 | 6/2004 | Colbeth et al. |
| 2001/0032942 A1* | 10/2001 | Shima et al. ................. 250/580 |
| 2002/0158206 A1* | 10/2002 | Street .................... 250/370.09 |
| 2002/0191737 A1 | 12/2002 | Tanigawa |

FOREIGN PATENT DOCUMENTS

| | | |
|---|---|---|
| EP | 0776124 A2 | 5/1997 |
| EP | 0776124 A3 | 5/1997 |

OTHER PUBLICATIONS

Brailean, J.C. et al. "Noise Reduction Filters for Dynamic Image Sequences: A Review" Proceedings of the IEEE (Sep. 1995) 83(9):1272-1292.

Fujieda, I. et al. "Two Operation Modes of 2D a-Si Sensor Arrays for Radiating Imaging" J. Non-Crystalline Solids 173 & 138 (1991) pp. 1321-1324.

Schiebel, U. et al. "Fluoroscopic X-Ray Imaging with Amorphous Silicon Thin-Film Arrays" SPIE vol. 2163 Physics of Medical Imaging (1994) pp. 129-140.

International Search Report dated Sep. 6, 2005 (PCT/US04/34111).

* cited by examiner

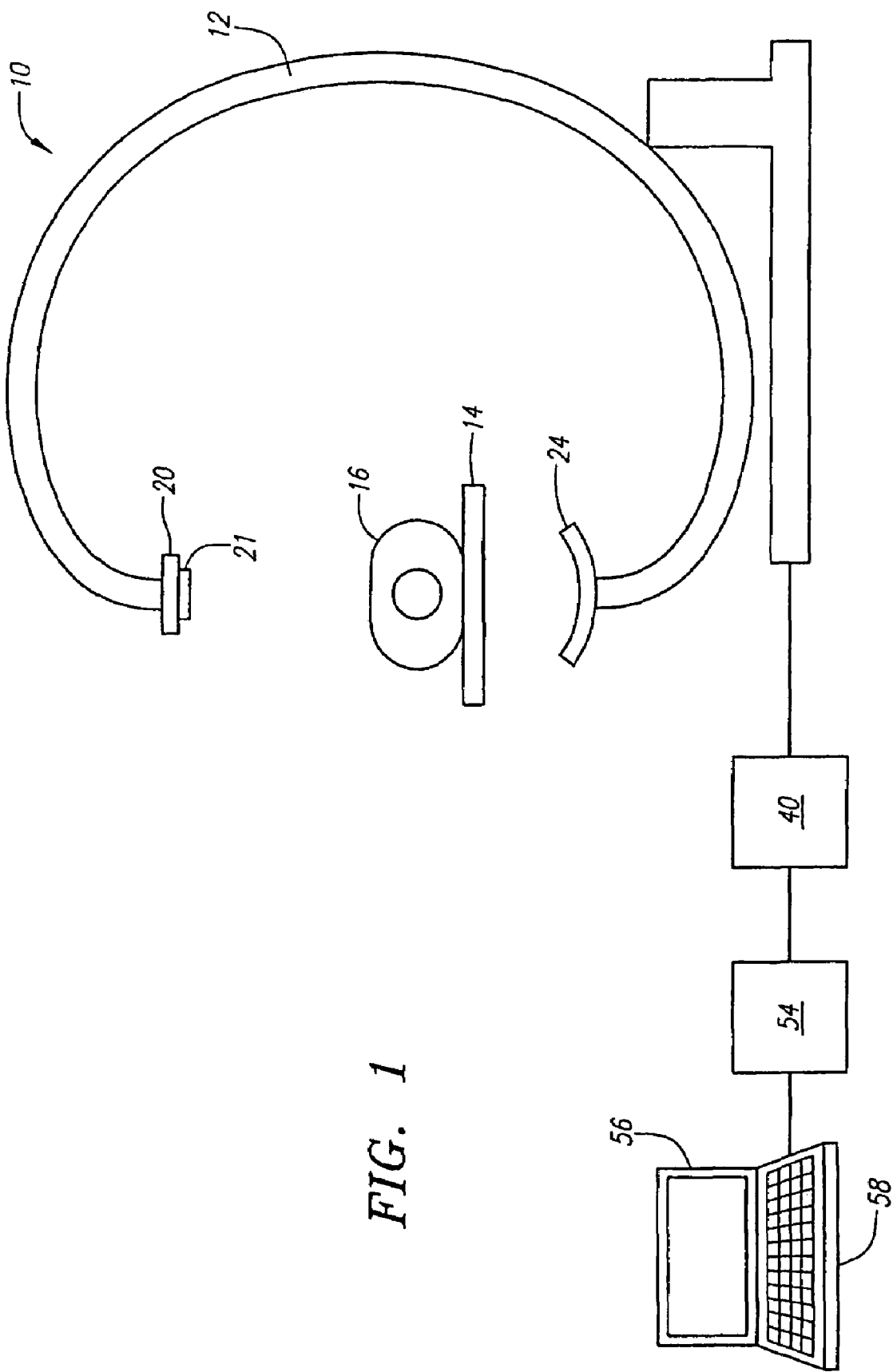

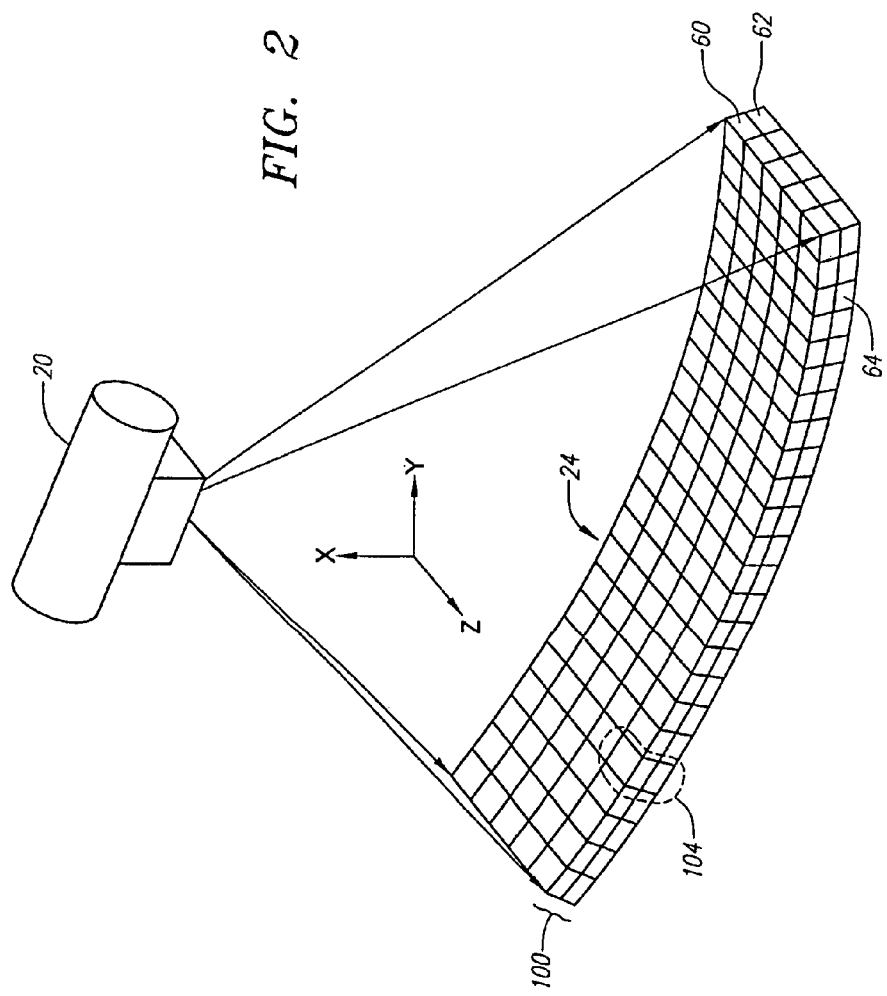

SYSTEMS AND METHODS FOR IMAGE ACQUISITION

RELATED APPLICATION DATA

This application is a continuation-in-part of U.S. patent application Ser. No. 10/687,552, filed on Oct. 15, 2003, the entire disclosure of which is incorporated by reference herein.

FIELD

This application relates generally to systems and methods for image acquisition and, more specifically, to systems and methods for collecting computed tomography (CT) image data.

BACKGROUND

Computed tomography is an imaging technique that has been widely used in the medical field. In a procedure for computed tomography, an x-ray source and a detector apparatus are positioned on opposite sides of a portion of a patient under examination. The x-ray source generates and directs a x-ray beam towards the patient, while the detector apparatus measures the x-ray absorption at a plurality of transmission paths defined by the x-ray beam during the process. The detector apparatus produces a voltage proportional to the intensity of incident x-rays, and the voltage is read and digitized for subsequent processing in a computer. By taking thousands of readings from multiple angles around the patient, relatively massive amounts of data are thus accumulated. The accumulated data are then analyzed and processed for reconstruction of a matrix (visual or otherwise), which constitutes a depiction of a density function of the bodily section being examined. By considering one or more of such sections, a skilled diagnostician can often diagnose various bodily ailments such as tumors, blood clots, etc.

A problem associated with existing CT imaging systems is that a patient may not feel comfortable confined within a gantry opening, especially when the image data collection procedure takes too long. Mechanical configuration and/or regulatory rules may limit the rotation rate of a gantry on which the x-ray source and the image detector are mounted. Some of the existing CT imaging devices have gantry speed that is limited to certain prescribed value. Although some of the existing CT scanners can be configured to rotate about a patient faster, the volumetric data set generated from such scanners may have motion artifacts between slices.

Another problem associated with existing CT imaging systems is that a slice thickness is generally larger than a resolution of a pixel within a slice. For example, an existing CT imaging system may generate a slice every 1 centimeter, while a resolution of a pixel within a slice is 0.5 millimeter. In order to create better resolution between slices, scanners have been developed that has an increased number of detectors in the Z-axis (axis of rotation) direction. However, increasing the number of detectors in the Z-axis increases the manufacturing cost of the detector, which is already quite expensive as it is based on traditional single crystal silicon electronics coupled to x-ray converters.

For the foregoing, improved apparatus and method for collecting CT image data and generating CT images would be desirable.

SUMMARY

In accordance with some embodiments, an imaging system includes a first image element in a first row, a second image element in the first row, a third image element in a second row, the third image element and the first image element being in a first column, a gate driver, a first electrical line extending from the gate driver, wherein the first and the second image elements are connected to the first electrical line, a second electrical line, wherein the first image element is connected to the second electrical line, and a third electrical line, wherein the third image element is connected to the third electrical line.

In accordance with other embodiments, a method for collecting image signals includes accessing a first image signal from a first image element in a first row and a second image signal from a second image element in a second row, wherein the first and the second image elements are located in a column, and accessing a third image signal from a third image element in the first row, wherein the first, second, and third image signals are accessed simultaneously, the first image signal is accessed using a first electrical line, and the second image signal is accessed using a second electrical line.

In accordance with other embodiments, a control module configured for generating a control signal to access a first image signal from a first image element, a second image signal from a second image element, and a third image signal from a third image element, wherein the first image element and the third image element are located in a first row, the second image element is located in a second row, the first and the second image elements are located in a column, the first image element is connected to a first electrical line for transmitting the first image signal, and the second image element is connected to a second electrical line for transmitting the second image signal.

In accordance with other embodiments, an imaging system includes an imager having a first line of image elements and a second line of image elements, wherein the first and the second lines are adjacent to each other such that there is no additional line of image elements located therebetween, and an access circuit coupled to the imager and configured to selectively either collect signals from the first line of image elements and from the second line of image elements simultaneously, or collect signals from the second line of image elements after signals from the first line of image elements are collected.

Other aspects and features will be evident from reading the following detailed description of the embodiments.

BRIEF DESCRIPTION OF THE DRAWINGS

The drawings illustrate the design and utility of embodiments, in which similar elements are referred to by common reference numerals. In order to better appreciate how advantages and objects of the embodiments are obtained, a more particular description will be rendered by reference to the accompanying drawings.

FIG. 2 shows an embodiment of the detector of FIG. 1;

FIG. 10 is a diagram of a computer hardware system with which embodiments described herein can be implemented.

DETAILED DESCRIPTION OF THE EMBODIMENTS

Figure 3:
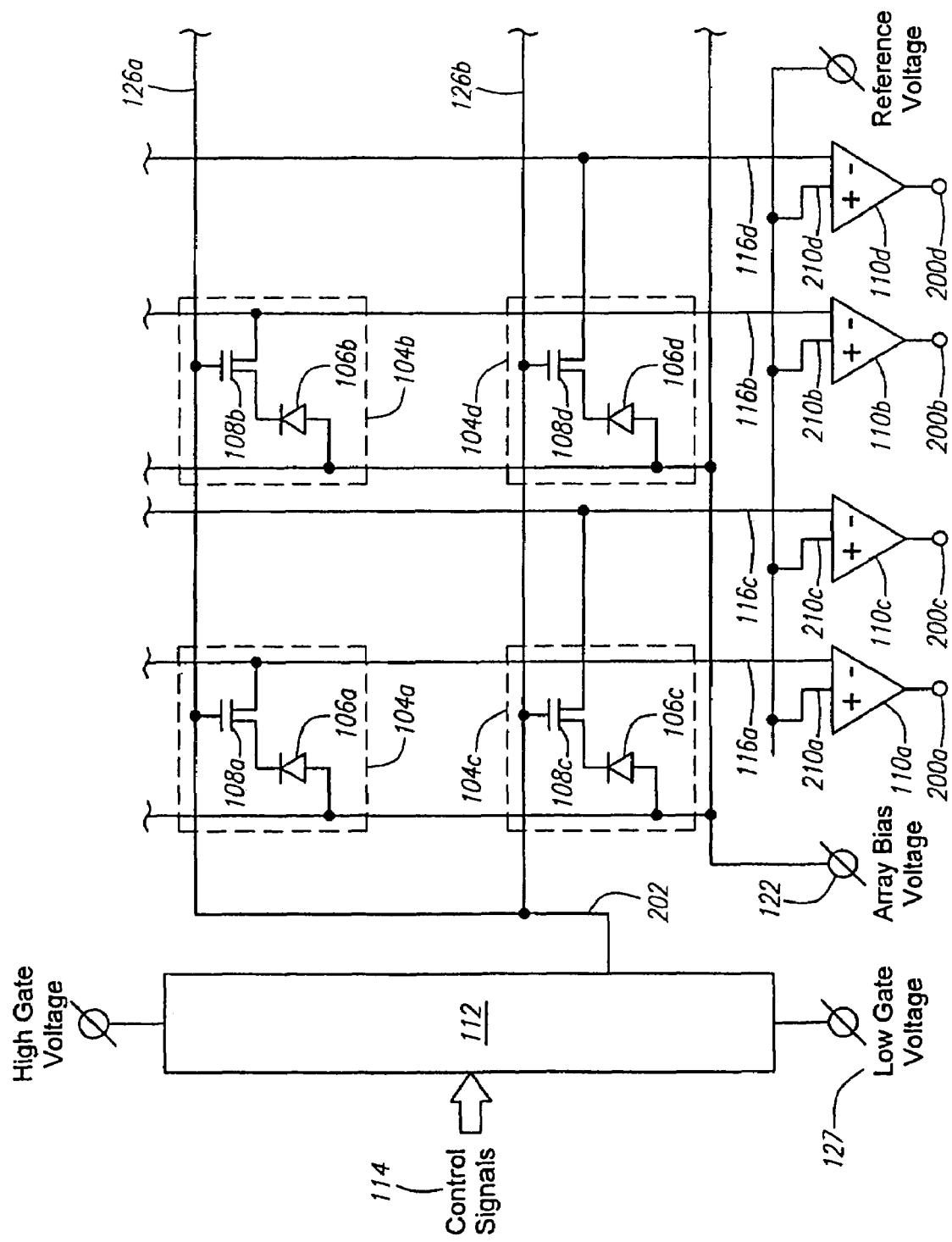
FIG. 3 shows one configuration of electrical components for the imager of FIG. 2 constructed in accordance with some embodiments, particularly showing the imager having a two-row readout configuration.

Various embodiments are described hereinafter with reference to the figures. It should be noted that the figures are not drawn to scale and elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an aspect and/or feature described in conjunction with a particular embodiment is not necessarily limited to that embodiment and can be practiced in any other embodiments.

Figure 1C:
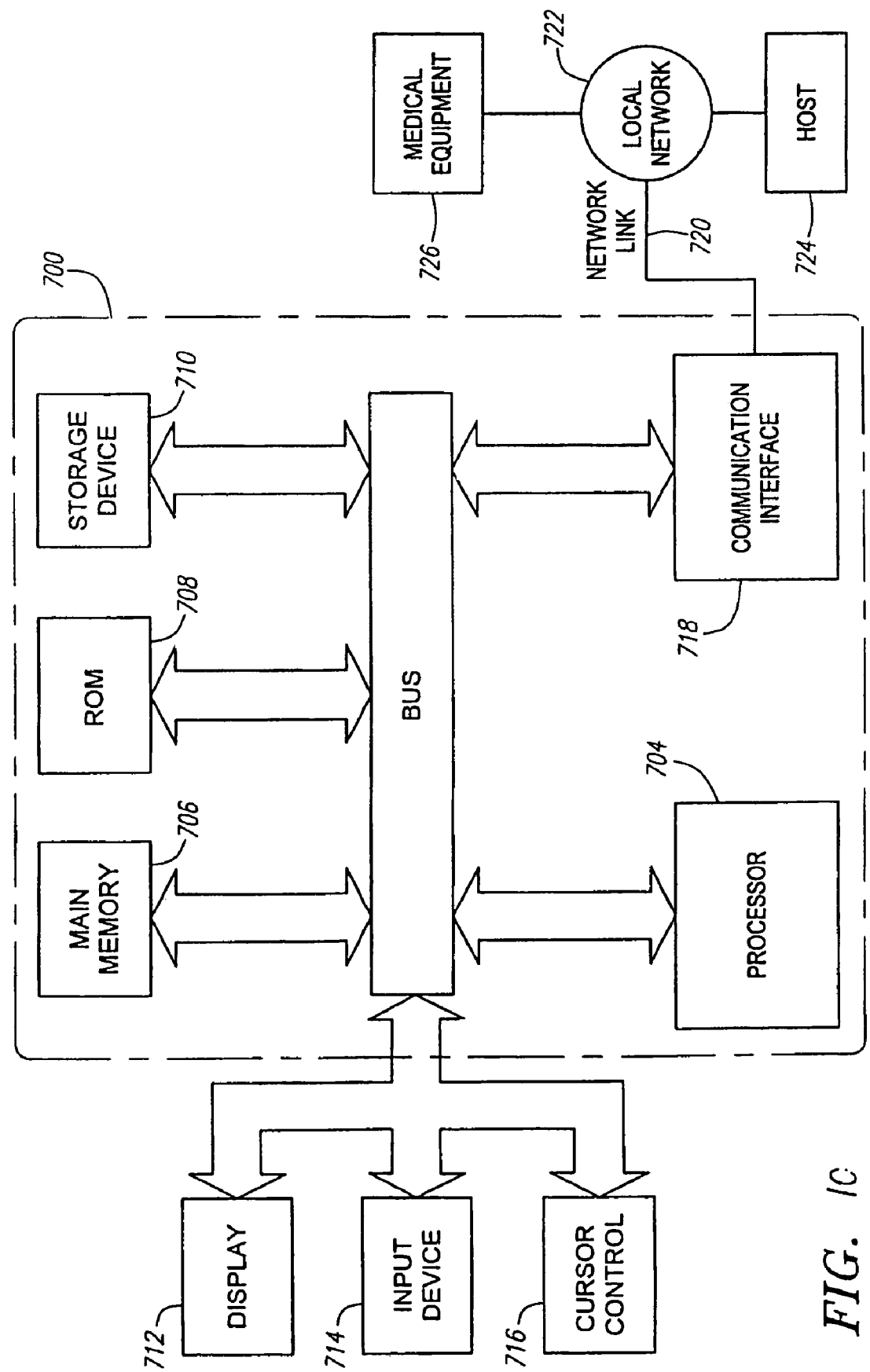
FIG. 1 illustrates a computed tomography system in which embodiments described herein may be implemented.

Referring now to the drawings, in which similar or corresponding parts are identified with the same reference numeral, FIG. 1 illustrates a computed tomography (CT) image acquisition system 10, which includes a detector 24 constructed in accordance with some embodiments. The system 10 includes a gantry 12, and a panel 14 for supporting a patient 16. The gantry 12 includes an x-ray source 20 that projects a beam of x-rays, such as a fan beam or a cone beam, towards the detector 24 on an opposite side of the gantry 12 while the patient 16 is positioned at least partially between the x-ray source 20 and the detector 24. The x-ray source 20 may include a collimator 21 for adjusting a shape of the x-ray beam. The detector 24 has a plurality of sensor elements configured for sensing a x-ray that passes through the patient 16. Each sensor element generates an electrical signal representative of an intensity of the x-ray beam as it passes through the patient 16.

In the illustrated embodiment, the CT image acquisition system 10 also includes a processor 54, a monitor 56 for displaying data, and an input device 58, such as a keyboard or a mouse, for inputting data. The processor 54 is coupled to a gantry rotation control 40. The rotation of the gantry 12 and the operation of the x-ray source 20 are controlled by the gantry rotation control 40, which provides power and timing signals to the x-ray source 20 and controls a rotational speed and position of the gantry 12 based on signals received from the processor 54. Although the control 40 is shown as a separate component from the gantry 12 and the processor 54, in alternative embodiments, the control 40 can be a part of the gantry 12 or the processor 54.

During a scan to acquire x-ray projection data (i.e., CT image data), the x-ray source 20 projects a beam of x-rays towards the detector 24 on an opposite side of the gantry 12, while the gantry 12 rotates about the patient 16. In one embodiment, the gantry 12 makes a 360° rotation around the patient 16 during image data acquisition. Alternatively, if a full cone detector is used, the system 10 may acquire data while the gantry 12 rotates 180° plus the angle of the beam pattern. Other angles of rotation may also be used, depending on the particular system being employed. In one embodiment, the detector 24 is configured to generate at least 900 frames of images in less than 1 second. In such case, the gantry 12 only needs to rotate around the patient 16 once in order to collect sufficient amount of image data for reconstruction of computed tomography images. In other embodiments, the detector 24 may be configured to generate frames at other speeds.

FIG. 2 shows a detector 24 constructed in accordance with some embodiments. As shown in FIG. 2, the detector 24 comprises an imager 100 that includes a x-ray conversion layer 60 made from a scintillator element, such as Cesium Iodide (CsI), and a photo detector array 62 (e.g., a photodiode layer) coupled to the x-ray conversion layer 60. The x-ray conversion layer 60 generates light photons in response to x-ray radiation, and the photo detector array 62, which includes a plurality of detector elements 64, is configured to generate electrical signal in response to the light photons from the x-ray conversion layer 60. In the illustrated embodiment, both the x-ray conversion layer 60 and the photo detector array 62 are pixilated, thereby forming a plurality of imaging elements 104. However, the x-ray conversion layer 60 may be non-pixilated in an alternative embodiment. As shown in FIG. 2, the imager 100 has a curvilinear surface (e.g., a partial circular arc). Such configuration is beneficial in that each of the imaging elements 104 of the imager 100 is located substantially the same distance from the x-ray source 20. In an alternative embodiment, the imager 100 may have a rectilinear surface or a surface having other profiles. In the illustrated embodiment, each image element 104 (or pixel) has a cross sectional dimension that is approximately 200 microns or more, and more preferably, approximately 300 microns or more. However, image elements having other dimensions may also be used. The imager 100 can be made from amorphous silicon, crystalline silicon wafers, crystalline silicon substrate, or flexible substrate (e.g., plastic), and may be constructed using flat panel technologies or other techniques known in the art of making imaging device.

FIG. 3 depicts one configuration of electrical components for the imager 100 in accordance with other embodiments. The imager 100 includes a plurality of the image elements 104, each of which comprises a photodiode 106 (forming part of the detector element 64) that generates an electrical signal in response to a light input. The photodiode 106 receives light input from the x-ray conversion layer 60 that generates light in response to x-rays. The photodiodes 106 are connected to an array bias voltage 122 to supply a reverse bias voltage for the image elements. A transistor 108 (such as a thin-film N-type FET) functions as a switching element for the image element 104. When it is desired to capture image data from the image elements 104, control signals 114 are sent to a gate driver 112 to "select" the gate(s) of transistors 108. The gate driver 112 is connected to a low gate voltage 127 and high gate voltage source that drives the gate control lines. Electrical signals from the photodiodes 106 are passed through lines 116 to corresponding charge amplifiers 110. The output of the charge amplifiers 110 is sent to a "sample and hold" stage for further image processing/display. In one embodiment, the gate driver 112 is a part of an access circuit, which may be secured to an edge of the imager 100. The access circuit may also include the charge amplifiers 110. While FIG. 3 only shows four image elements 104a-104d, those skilled in the art understands that the imager 100 may include many such image elements 104, depending upon the size and resolution of the imaging device. In addition, although only two lines 126a and 126b of image elements 104 are shown, the imager 100 may include more than two lines 126 of image elements 104. In other embodiments, gate driver 112 may have multiple outputs 202 accessing separately multiple groups of gate lines 126.

The imager 100 performs simultaneous sampling of image data from image elements 104 in a correlated manner. In the illustrated embodiment, the imager 100 includes corresponding amplifiers 110 for each of the image elements 104 on the two lines 126a and 126b, thereby allowing image data from the two lines 126a and 126b of image elements 104 to be collected or read simultaneously (i.e., at substantially the same time). All the switching transistors 108a-108d for image elements 104a-104d on the two-lines 126a and 126b are tied to the same control line 202 extending from gate driver 112. When the image data for the two lines 126a and 126b of image elements 104 are desired, control signals 114 are sent to the gate driver 112 to select the transistor gates for the desired lines (e.g., 126a and 126b) of image elements. The electrical signals from the entire lines 126a and 126b of image elements are passed to their corresponding charge amplifiers 110, which output signal data to the subsequent sampling stage. If the imager 100 has more than two lines 126 of image elements 104, to form an entire image frame, image data are collected two lines at a time until all lines 126 of image elements 104 on the imager 100 have been sampled. For a given configuration of the imager 100, a signal readout time for each line 126 of image elements 104 depends on the time it takes to turn on a pixel and discharge a corresponding signal, and is generally fixed (e.g., approximately 40 microseconds). As such, by configuring the imager 100 to allow signals from two or more lines of image elements 104 to be read simultaneously or in parallel, the time it takes to readout signals from all the lines 126 of the imager can be reduced. This in turn, improves the frame rate (i.e., number of image frames that can be generated by the imager 100 per second) of the imager 100.

Figure 4:
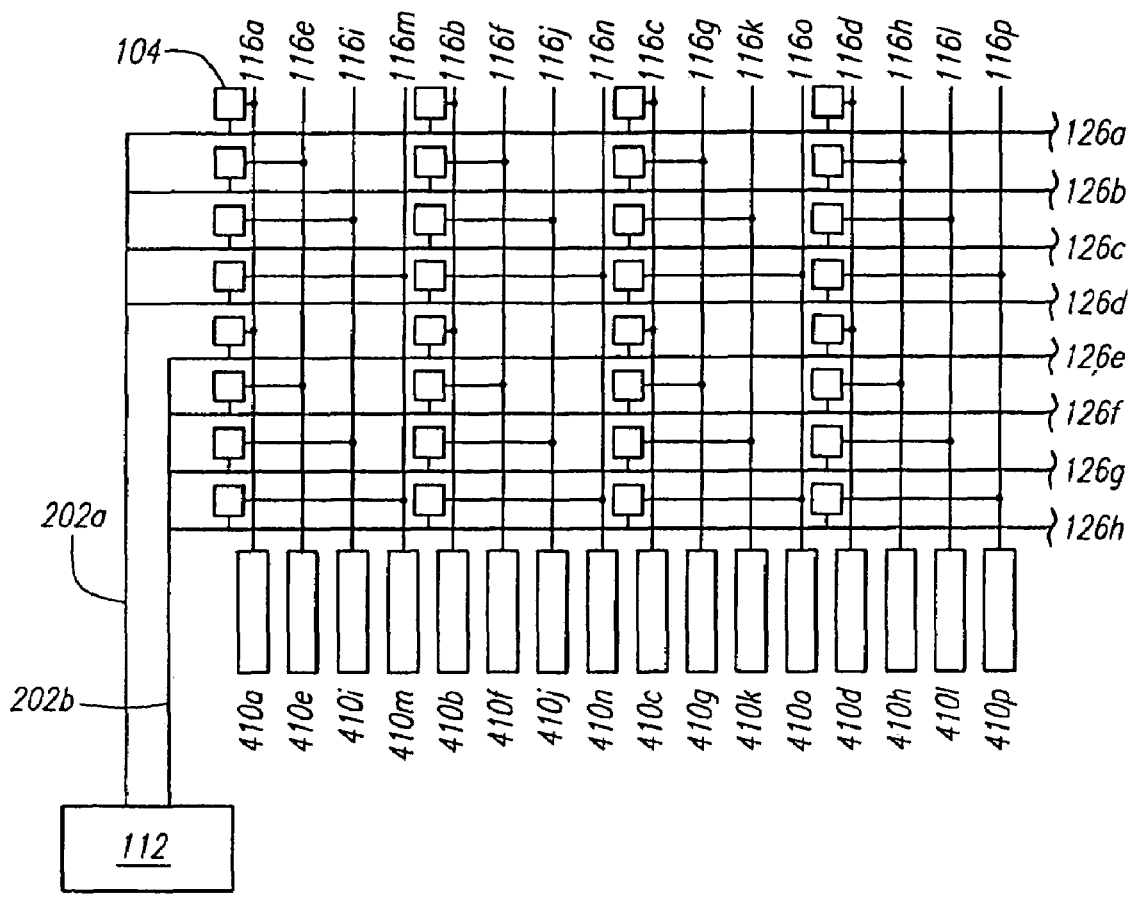
FIG. 4 shows a variation of the flat panel imager of FIG. 3, particularly showing the imager having a four-row readout configuration.

Although the above embodiment of the imager 100 has been described as having a two-line readout configuration, in alternative embodiments, the imager 100 may have a configuration that allows signals be collected from more than two lines of image elements 104 at a time. FIG. 4 shows a variation of the imager 100 which has a four-line readout configuration. As shown in FIG. 4, image elements 104 on every four lines (e.g., 126a-126d or 126e-126h) are connected to corresponding devices, such as amplifiers 110a-110p (not shown) through connecting lines 126a-116p and connecting pads 410a-410p, respectively. In the illustrated embodiment, all the switching transistors for image elements 104 on the four lines 126a-126d are tied to the same control line 202a extending from the gate driver 112, and all the switching transistors for image elements 104 on the four lines 126e-126h are tied to the same control line 202b extending from the gate driver 112. When the image data for the four lines 126a-d of image elements 104 are desired, control signals 114 are sent to the gate driver 112 to select (via the control line 202a) only the transistor gates for the four lines 126a-126d of image elements 104. The electrical signals from the image elements 104 on the four lines 126a-d are passed to their corresponding charge amplifiers 110a-p, which output signal data to the subsequent sampling stage. To collect signals from the next four lines 126e-126h of image elements 104, control signals 114 are sent to the gate driver 112 to select (via the control line 202b) only the transistor gates for the four lines 126e-126h of image elements 104. To form an entire image frame, image data are collected four lines at a time until all lines of image elements 104 on the imager 100 have been sampled.

As shown in FIG. 4, the number of connecting pads 410 or interconnects that can be accommodated within a given length is limited by the size of the connecting pads 410 and a spacing between the connecting pads 410. The number of connecting pads 410 that can be fitted within a given length may limit the number of lines 126 of image elements 104 that can be simultaneously selected and connected to corresponding devices, such as the amplifiers 110. In one embodiment, to increase the interconnects of the imager 100, each image element 104 may be made larger, or alternatively, the number of image elements 104 along each line 126 may be reduced. For example, in one embodiment, each image element 104 may have a cross sectional dimension that is larger than approximately 300 microns, or more preferably, more than approximately 400 microns. However, image elements having other dimensions may also be used. Those skilled in the art understand that the larger the image element 104, and/or the fewer the number of the image elements 104 along each line 126, the higher the number of interconnects, and the higher the frame rate that can be achieved.

Figure 5:
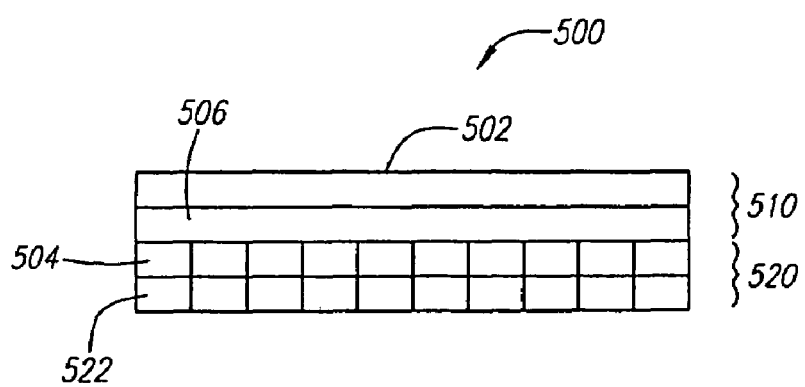
FIG. 5 shows a variation of the detector of FIG. 2, particularly showing the imager having a layer of photoconductor.

Although the imager 100 has been described as having the x-ray conversion layer 60, in alternative embodiments, the imager 100 may use different detection schemes. For example, in alternative embodiments, instead of having the x-ray conversion layer 60, the imager 100 may include a photoconductor, which generates electron-hole-pairs or charges in response to x-ray. FIG. 5 schematically shows an imager 500 constructed in accordance with alternative embodiments. The flat panel imager 500 includes an x-ray conversion panel 510 aligned with a detector array 520. The x-ray conversion panel 510 includes a first electrode 502, a second electrode 504, and a photoconductor 506 secured between the first electrode 502 and the second electrode 504. The electrodes 502 and 504 may be made from a wide variety of materials, such as silver, chromium, aluminum, gold, nickel, vanadium, zinc, palladium, platinum, carbon, etc., and alloys of these materials. The photoconductor 506 can be made from a variety of materials, such as mercuric Iodide (HgI2), Lead Iodide (PbI2), Bismuth Iodide (BiI3), Cesium Iodide (CsI), Cadmium Zinc Telluride (CdZnTe), Amorphous Selenium (a-Se), or equivalent thereof. Other materials known in the art may also be used. The photoconductor 506 may be a single or poly-crystalline layer. The photoconductor 506 is preferably deposited by physical vapor deposition (PVD) or particle in binder process (PIB). Alternatively, if the photoconductor 506 is deposited on a separate substrate (such as those made from Cadmium Zinc Telluride ($Cd_{(1-x)}Zn_xTe$) semiconductor crystals or ZnTe materials), then it may be secured to the first and second electrodes 502 and 504 by indium bump(s). Alternatively, the photoconductor 506 may also be secured to the first and second electrodes 502 and 504 by a suitable adhesive, depending on the materials from which the photoconductor 506 and the first and second electrodes 502 and 504 are made. Other techniques known in the art may also be used to secure the photoconductor 506 to the first and second electrodes 502 and 504. Photoconductors and imagers made therefrom are well known in the art, and therefore would not be described in further details herein.

When using the flat panel imager 500, the first and second electrodes 502 and 504 are biased by a voltage source to create a potential difference or a bias between the first and second electrodes 502 and 504. The biased electrodes 502 and 504 create an electric field across the region between the first and second electrodes 502 and 504. When the photoconductor 506 is irradiated by x-ray, a response, such as electron hole pairs (EHPs) or charges, are generated and drift apart under the influence of the electric field across the region between the first and second electrodes 502 and 504. The charges are collected by the detector array 520, which includes a plurality of detector elements 522 arranged in a two-dimensional array. The detector elements 522 are configured to generate electric signals in response to the charges collected on the first electrode 502. In one embodiment, the detector elements 522 are charge detectors. Each detector element 522 may have a storage capacitor to store the charge generated by the X-rays and collected by the first electrode 502. Each detector element 522 may also include a switching element, such as a thin film transistor (TFT), a switching diode, or the like, to access the collected charge by readout electronics. Optionally the detector elements 522 can contain further components for signal or charge buffering and amplification. The detector elements 522 may also include polycrystalline silicon or organic active elements. Each of the detector elements 522 forms a pixel of the X-ray image generated using the detector array 520. The detector array 520 also includes a pixel access circuit (not shown) coupled to detector elements 522. The pixel access circuit accesses the detector elements 522 and reads the electric signals from the detectors elements 522. The process of accessing detector elements 522 and reading electric signals there from is similarly discussed previously with reference to FIG. 3. In one embodiment, pixel access circuit includes a gate driver that generates row access signals to sequentially access detector elements 522 by rows and reads electric signals out of detector elements 522 by columns. Each row access signal can access either a single row or multiple rows of detectors elements 522. Likewise, each read action can read electric signals from either a single column or a plurality of columns of the detectors elements 522.

Figure 6:
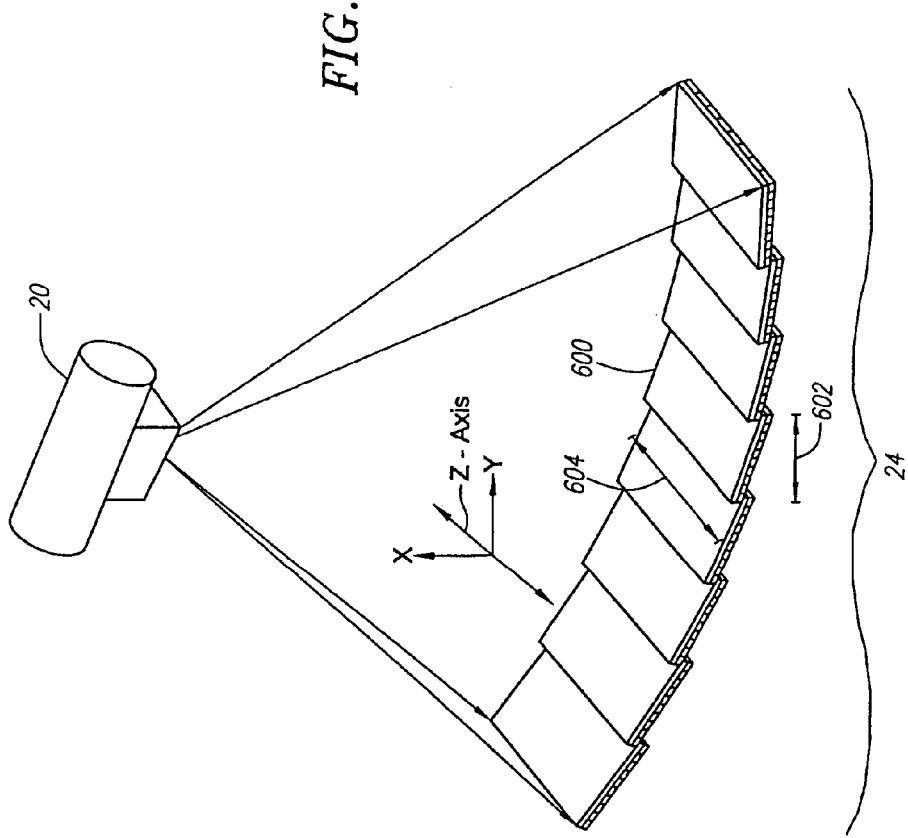
FIG. 6 shows an alternative embodiment of the detector of FIG. 1.

FIG. 6 shows another embodiment of the detector 24 that includes a plurality of imagers 600. In one embodiment, each imager 600 has a panel width 602 that is between 2 to 10 centimeters (cm), and a panel depth 604 that is between 20 to 60 cm, and more preferably, between 30 to 40 cm. However, each imager 600 may also have other dimensions in alternative embodiments. In the illustrated embodiment, each of the imagers 600 is stacked against an edge of a neighboring imager 600. This configuration is beneficial in that the imagers 600 provide a non-discontinuous surface to capture image signals, thereby preventing a gap in the collected image data. Alternatively, the imagers 600 may be positioned next to each other such that a substantially continuous surface can be formed. Although eight imagers 600 are shown, in alternative embodiments, the detector 24 may include one or other numbers of imagers 600, depending on a particular specification of the detector 24. In addition, although the imagers 600 collectively form a curvilinear profile of the detector 24, in alternative embodiments, the imagers 600 may collectively form an approximately straight surface or other profiles for the detector 24.

Constructing the detector 24 using a plurality of the imagers 600 has several advantages. First, the manufacturing cost of the detector 24 is reduced since it is easier and less expensive to manufacture a number of smaller imagers 600 than to manufacture a single imager of sufficient size that can meet the specification of the detector 24. In addition, the plurality of the imagers 600 provides another level of multiplexing in that signals from one or more lines of image elements 104 in one of the imagers 600 can be read simultaneously with signals from one or more lines of image elements 104 in another of the imagers 600 by the gate driver 112. In one embodiment, the gate driver 112 can be configured to read signals from the first two rows of all of the imagers 600 simultaneously, and then from the next two rows, etc., until signals from all the rows of the imagers 600 have been read. Such configuration provides a much higher frame rate for the detector 24, thereby allowing more image data to be collected in a given period.

For example, assuming that the detector 24 has fourteen imagers 600, each of which has fifty rows of image elements 104. In such case, if an average readout rate for a row is 40 microseconds, it will take 2000 microseconds (=40 microseconds×50 rows) to read signals from the entire detector 24, thereby providing 500 frame rate per second (1/2000 microseconds). If multiple rows readout scheme is used, e.g., assuming signals are read from every two rows simultaneously, it will take 1000 microseconds to read signals from the entire detector 24, thereby providing 1000 frame rate per second. Both of these configurations provide much better frame rate than conventional detectors that use a single row readout scheme for the entire detector. For example, using a conventional readout scheme, it will take 24000 microseconds (=40 microseconds×600 rows) to read signals from a detector that has the same number of rows (i.e., 600 rows) of image elements, providing only 41 frames per second. Those skilled in the art understand that the more the number of the flat panel imagers 600 used, the higher the frame rate that can be achieved.

Constructing the detector 24 using a plurality of the imagers 600 can also provide better resolution for images. For example, for a given prescribed frame rate, the detector 24 can be configured to provide better resolution by using more number of the imagers 600 that are smaller, but have lower pixel pitch. In one embodiment, the detector 24 includes twenty-four imagers 600, each of which has a panel width of approximately 2.5 centimeters and has a pixel pitch of approximately 380 um. Such configuration provides approximately the same frame rate, but a much higher resolution, as compared to a detector that includes fourteen imagers 600, with each imager 600 having a panel width of approximately 4.5 centimeters and a pixel pitch of approximately 500 um.

It should be noted that in the illustrated embodiment in which a plurality of the imagers 600 is used, the reading of signals is not limited to two or more rows at a time, and that the gate driver 112 can be configured to access one row of image elements 104 at a time. For example, in alternative embodiments, the gate driver 112 can be configured to read signals from the first rows of all of the imagers 600 simultaneously, and then from the second rows, etc., until signals from all the rows of the imagers 600 have been read.

Figure 7:
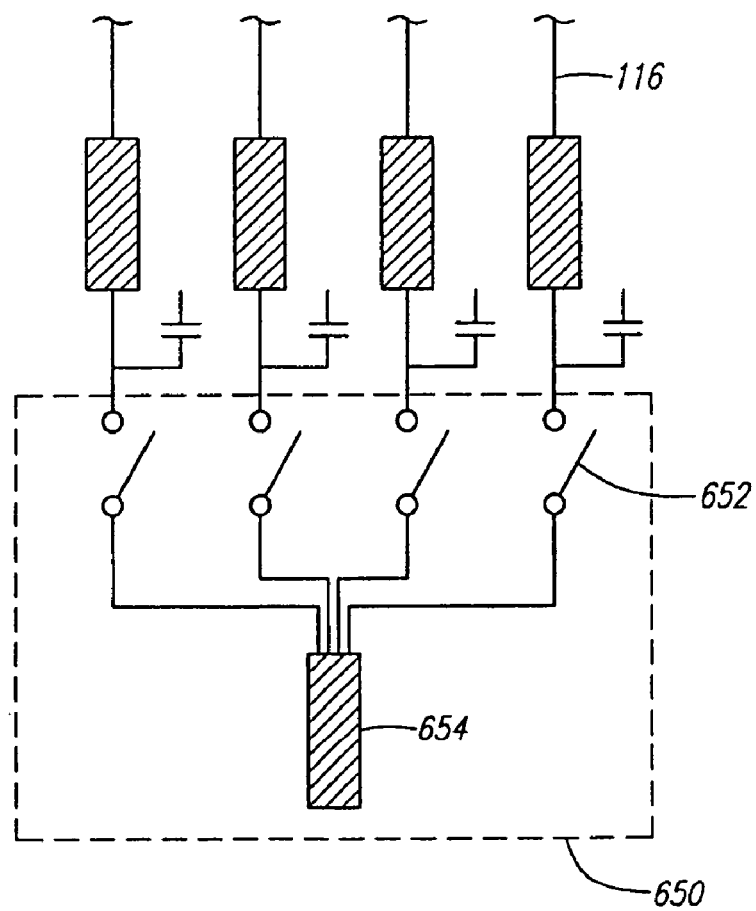
FIG. 7 shows a multiplex multi-row readout unit.

FIG. 7 shows a multiplex multi-row readout unit 650 that may be implemented in any of the above-described embodiments of imagers or in conventional imagers. The readout unit 650 includes a plurality of switches 652 connected to a common pad 654. Each of the switches 652 has a low resistance, thereby allowing signals from the image elements 104 to be read quickly. During use, the switches 652 switch consecutively to transmit signals to the common pad 654. The common pad 654 may be coupled to a device, such as an amplifier, a storage device, or a processor, which receives the signals. In the illustrated embodiment, the readout unit 650 includes four switches 652. However, the readout unit 650 may also include other numbers of switches 652 in alternative embodiments.

Figure 8:
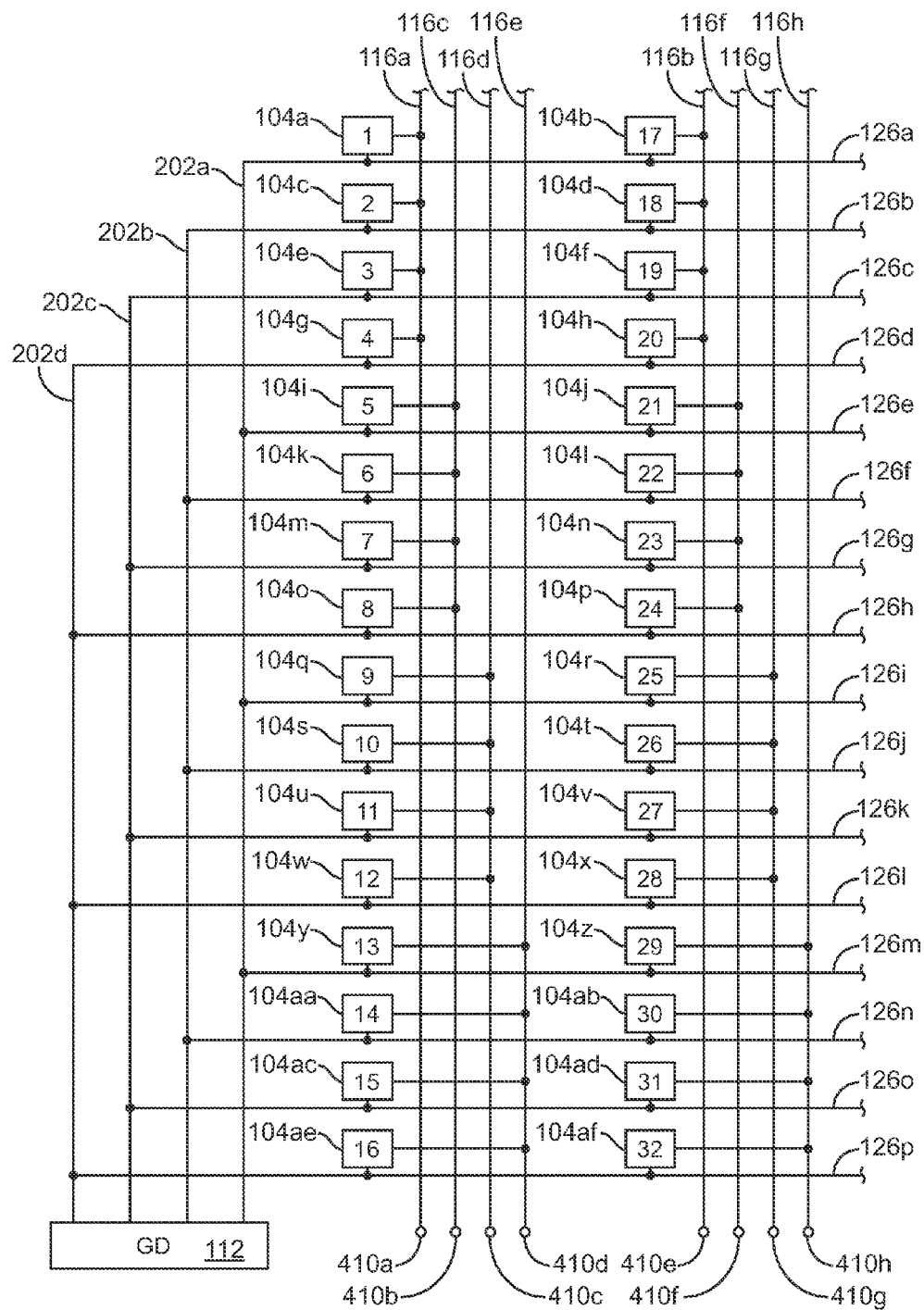
FIG. 8 illustrates an imager in accordance with other embodiments.

FIG. 8 illustrates a variation of the imager 100 in accordance with other embodiments. The imager 100 of FIG. 8 may be used with the image acquisition system 10 of FIG. 1. In other embodiments, the imager 100 of FIG. 8 may be used with other radiation systems, such as a cone beam CT machine, a radiation treatment system, or other medical devices. As shown in FIG. 8, image elements 104 (e.g., image elements 104a, 104c, 104e, 104g) on every four consecutive lines (e.g., lines 126a-126d) are connected to a corresponding node 410 (e.g., node 410a) through connecting a line 116 (e.g., line 116a). In some embodiments, each node 410 is a connecting pad, which may be connected to a charge amplifier (e.g., amplifier 110). In other embodiments, each node 410 may itself be an amplifier. Also, in the illustrated embodiment, image elements 104 on every other fourth lines (e.g., lines 126a, 126e, 126i, 126m) are tied to the same control line 202 (e.g., control line 202a) extending from the gate driver 112. The gate driver 112 is coupled to a control module, which is configured (e.g., programmed or designed) to generate control signal(s) to operate the gate driver 112 to thereby access image signals from the imager 100. The control module may be a FPGA, a microprocessor, or circuit that is capable of performing processing function(s).

Figure 9:
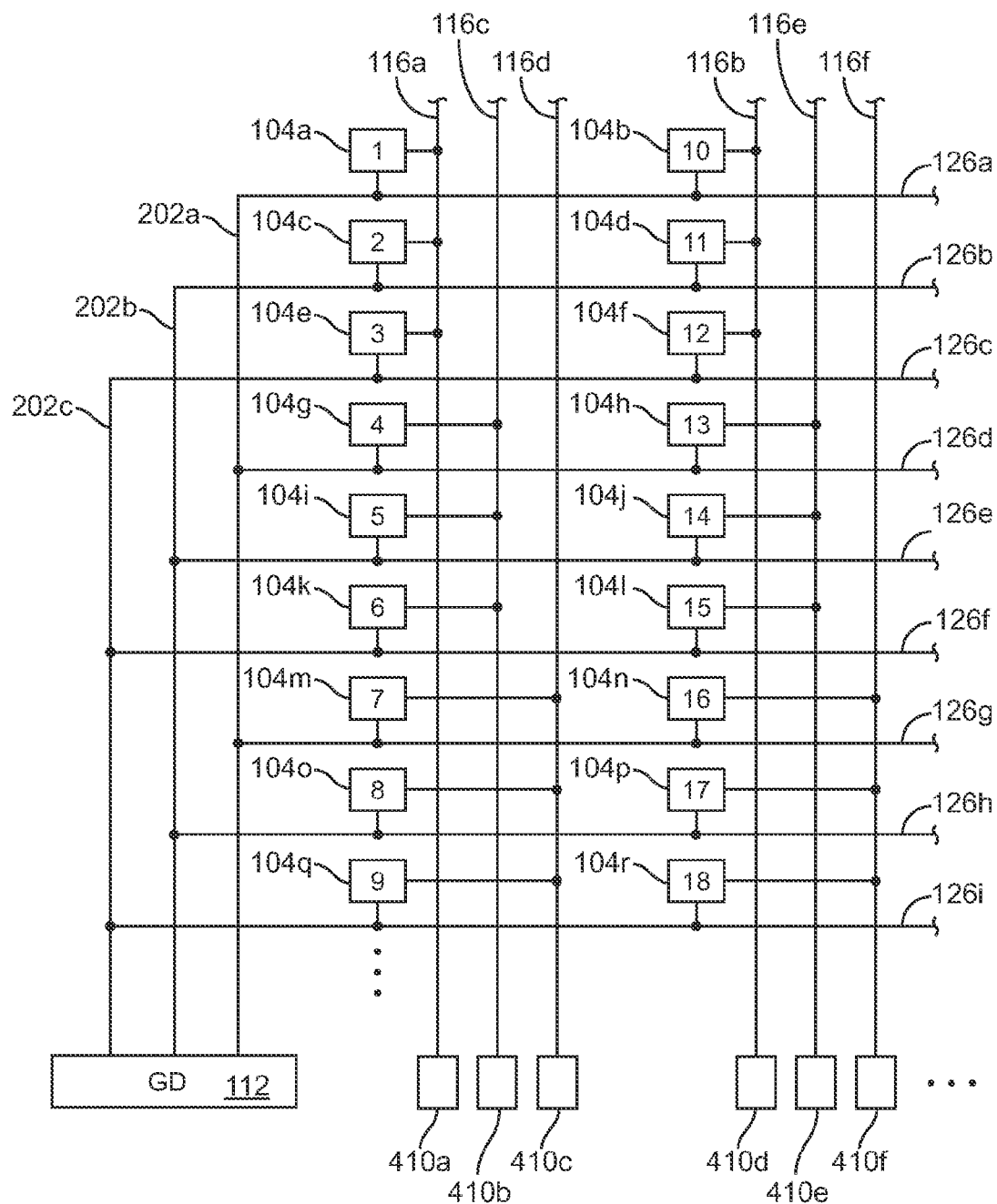
FIG. 9 illustrates an imager in accordance with other embodiments.

Although only two columns of image elements 104 are illustrated, it is understood that the imager 100 may have more than two columns of image elements 104 in other embodiments. Also, in other embodiments, the imager 100 may have more or less than sixteen rows of image elements 104. In further embodiments, instead of connecting image elements 104 from every four consecutive rows to a line 116, the imager 100 may have image elements 104 from every two or three consecutive rows, or from five or more consecutive rows, connected to a line 116. FIG. 9 illustrates a variation of the imager 100 in which image elements 104 from every three consecutive rows are connected to a line 116. In some embodiments, similar arrangement may be made to create an imager 100 in which image elements 104 from every eight consecutive rows are connected to a line 116. For example, image elements 104 on eight consecutive rows may be connected to a corresponding node 410 through connecting a line 116, and image elements 104 on every eighth lines (e.g., 126a, 126h, etc.) may be tied to the same control line 202 extending from the gate driver 112. In any of the embodiments described herein, instead of connecting a group of consecutive rows to the a 116, two or more non-consecutive rows may be connected to a line 116.

When using the imager 100 of FIG. 8, the gate driver 112 may access the first, fifth, ninth, and thirteenth rows (using lines 126a, 126e, 126i, 126m) to collect signals from image elements 104a, 104b, 104i, 104j, 104q, 104r, 104y, 104z at nodes 410a-410h simultaneously. For example, control signal(s) 114 may be sent to the gate driver 112 to select (via the control line 202a) the transistor gates for the rows 126a, 126e, 126i, 126m of image elements 104. The electrical signals from the image elements 104 in the rows 126a, 126e, 126i, 126m are then passed to their corresponding nodes 410a-410h. Next, the gate driver 112 accesses the second, sixth, tenth, and fourteenth rows (using lines 126b, 126f, 126j, 126n) to collect signals from image elements 104c, 104d, 104k, 104l, 104s, 104t, 104aa, 104ab at nodes 410a-410h simultaneously. The image data collection process continues until image signals from all of the rows 126 have been collected.

In some embodiments, the first set of image signals (from image elements 104a, 104b, 104i, 104j, 104q, 104r, 104y, 104z) collected at nodes 410a-410h are recorded before the second set of image signals (from image elements 104c, 104d, 104k, 104l, 104s, 104t, 104aa, 104ab) are collected at nodes 410a-410g. Similarly, the second set of image signals collected at nodes 410a-410h are recorded before the next set of image signals (from image elements 104e, 104f, 104m, 104n, 104u, 104v, 104ac, 104ad) are collected at nodes 410a-410h. Such technique ensures that previously collected image data at nodes 410a-410h are not lost, or are not combined with later collected image data at the same nodes, and that the previously collected image data are preserved for use to construct a complete image frame. For example, the image frame may include a first pixel (point) obtained from the image signal from the image element 104a, and a second pixel obtained from the image signal from the image element 104c.

In other embodiments, the imager 100 of FIG. 8 may be used in a binning scenario. In such cases, the gate driver 112 would access the first, second, third, and fourth rows using lines 126a-126d, to collect image signals from elements 104a, 104c, 104e, 104g and bin (combine) them at node 410a, and to collect image signals from elements 104b, 104d, 104f, 104h and bin them at node 410e. In some embodiments, if the imager 100 has more than two columns of image elements 104, all of the image elements 104 in the first four rows may be accessed simultaneously using the lines 126a-126d. In some embodiments, the gate driver 112 may access all of the rows using all of the lines 126. In such cases, in addition to collecting image signals from elements 104a-104h as discussed, image signals from elements 104i, 104k, 104m, 104o will be collected and binned at node 410b, image signals from elements 104j, 104l, 104n, 104p will be collected and binned at node 410f, image signals from elements 104q, 104s, 104u, 104w will be collected and binned at node 410c, image signals from elements 104r, 104t, 104v, 104x will be collected and binned at node 410g, image signals from elements 104y, 104aa, 104ac, 104ae will be collected and binned at node 410d, and image signals from elements 104z, 104ab, 104ad, 104af will be collected and binned at node 410h. In some embodiments, the accessing of all of the rows may be performed simultaneously. In other embodiments, the accessing of all of the rows may be performed in groups (e.g., accessing the first four rows first, and then the second four rows, and so forth).

Also, in further embodiments, signals from every two consecutive lines (e.g., lines 126a, 126b) are binned, and image elements (e.g., image elements on lines 126c, 126d) from the remaining set (set of four rows) are not accessed while signals from lines 126a, 126b are being collected. After signals from lines 126a, 126b are collected and binned (and stored), signals from lines 126c, 126d are then collected and binned (and stored). The stored binned signals may then be used to generate an image, in which the first set of binned signals provides a first line in the image, and the second set of binned signals provides another line in the image. As such, the configuration of the imager of FIG. 8 allows selective binning of signals from two or more adjacent rows.

As illustrated in the embodiments, when using the imager 100 in a binning scenario, the speed of accessing the signals may be improved (e.g., by simultaneous accessing more of the rows simultaneously). In some cases, the benefit of having the improved speed may be desirable, despite the fact that the resolution of an image may decrease due to the combined (binned) image signals. Also, in some embodiments, the signals from the image elements 104 may add up with binning, which in turn, may increase the signal-to-noise (SNR) ratio.

As illustrated in the above embodiments, the imagers 100 of FIGS. 8 and 9 allow image signals from two or more consecutive lines of image elements 104 to be binned. Such feature allows the image signals from the imager 100 to be accessed at a faster speed without significantly affecting the resolution of the image. This is because characteristics/features of two adjacent image signals may not vary significantly, and therefore, may be desirably binned. Also, the imager 100 of FIG. 8 is advantageous in that it allows image signals from every two consecutive lines (e.g., 126a and 126b, 126c and 126d, 126e and 126f, etc.), or from every four consecutive lines (e.g., 126a-126d, 126e-126h, etc.), to be binned simultaneously. In some embodiments, a user interface may be provided that allows a user to select the number (e.g. any number between 2 and 16, inclusive) of consecutive lines of image elements 104 that are desired to be binned. In further embodiments, the user interface also allows a user to select "no binning," in which case, image signals from each line of image elements 104 is not binned with another line of image elements 104, as discussed.

It should be noted that although several lines of image elements are shown in the various embodiments of the imager 100, in some embodiments, the imager 100 may include hundred(s) or thousand(s) of lines of image elements. For example, the configuration of the embodiments of the imager 100 shown in FIGS. 8 and 9 may be multiplied or repeated to thereby form an imager 100 having many lines (e.g., hundred(s) or thousand(s)) of image elements. In some embodiments, the number of image elements may be in the order of million(s).

Computer System Architecture

FIG. 10 is a block diagram that illustrates an embodiment of a computer system 700 upon which embodiments described herein may be implemented. Computer system 700 includes a bus 702 or other communication mechanism for communicating information, and a processor 704 coupled with the bus 702 for processing information. The processor 704 may be an example of the processor 54, or alternatively, an example of a component of the processor 54, of FIG. 1. The computer system 700 also includes a main memory 706, such as a random access memory (RAM) or other dynamic storage device, coupled to the bus 702 for storing information and instructions to be executed by the processor 704. The main memory 706 also may be used for storing temporary variables or other intermediate information during execution of instructions to be executed by the processor 704. The computer system 700 further includes a read only memory (ROM) 708 or other static storage device coupled to the bus 702 for storing static information and instructions for the processor 704. A data storage device 710, such as a magnetic disk or optical disk, is provided and coupled to the bus 702 for storing information and instructions.

The computer system 700 may be coupled via the bus 702 to a display 77, such as a cathode ray tube (CRT), for displaying information to a user. An input device 714, including alphanumeric and other keys, is coupled to the bus 702 for communicating information and command selections to processor 704. Another type of user input device is cursor control 716, such as a mouse, a trackball, or cursor direction keys for communicating direction information and command selections to processor 704 and for controlling cursor movement on display 77. This input device typically has two degrees of freedom in two axes, a first axis (e.g., x) and a second axis (e.g., y), that allows the device to specify positions in a plane.

In some embodiments, a computer system 700 may be used for collecting and processing image data. According to some embodiments, such use is provided by computer system 700 in response to processor 704 executing one or more sequences of one or more instructions contained in the main memory 706. Such instructions may be read into the main memory 706 from another computer-readable medium, such as storage device 710. Execution of the sequences of instructions contained in the main memory 706 causes the processor 704 to perform the process steps described herein. One or more processors in a multi-processing arrangement may also be employed to execute the sequences of instructions contained in the main memory 706. In alternative embodiments, hard-wired circuitry may be used in place of or in combination with software instructions to implement the embodiments described herein. Thus, embodiments are not limited to any specific combination of hardware circuitry and software.

The term "computer-readable medium" as used herein refers to any medium that participates in providing instructions to the processor 704 for execution. Such a medium may take many forms, including but not limited to, non-volatile media, volatile media, and transmission media. Non-volatile media includes, for example, optical or magnetic disks, such as the storage device 710. Volatile media includes dynamic memory, such as the main memory 706. Transmission media includes coaxial cables, copper wire and fiber optics, including the wires that comprise the bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 704 for execution. For example, the instructions may initially be carried on a magnetic disk of a remote computer. The remote computer can load the instructions into its dynamic memory and send the instructions over a telephone line using a modem. A modem local to the computer system 700 can receive the data on the telephone line and use an infrared transmitter to convert the data to an infrared signal. An infrared detector coupled to the bus 702 can receive the data carried in the infrared signal and place the data on the bus 702. The bus 702 carries the data to the main memory 706, from which the processor 704 retrieves and executes the instructions. The instructions received by the main memory 706 may optionally be stored on the storage device 710 either before or after execution by the processor 704.

The computer system 700 also includes a communication interface 718 coupled to the bus 702. The communication interface 718 provides a two-way data communication coupling to a network link 720 that is connected to a local network 722. For example, the communication interface 718 may be an integrated services digital network (ISDN) card or a modem to provide a data communication connection to a corresponding type of telephone line. As another example, the communication interface 718 may be a local area network (LAN) card to provide a data communication connection to a compatible LAN. Wireless links may also be implemented. In any such implementation, the communication interface 718 sends and receives electrical, electromagnetic or optical signals that carry data streams representing various types of information.

The network link 720 typically provides data communication through one or more networks to other devices. For example, the network link 720 may provide a connection through local network 722 to a host computer 724 or to a medical equipment 726. The data streams transported over the network link 720 can comprise electrical, electromagnetic or optical signals. The signals through the various networks and the signals on the network link 720 and through the communication interface 718, which carry data to and from the computer system 700, are exemplary forms of carrier waves transporting the information. The computer system 700 can send messages and receive data, including program code, through the network(s), the network link 720, and the communication interface 718.

It should be noted that, as used in this specification, the terms "column" and "row" need not refer to vertical and horizontal lines of image elements respectively, and that the terms "column" and "row" may be used interchangeably. For example, the term "column" may refer to a horizontal line of image elements, and the term "row" may refer to a vertical line of image elements. Also, the term "first column" (or "first row") needs not refer to the very first line of image elements in an imager, and it may be used to refer to any of the lines in an imager. The same applies with respect to the terms "second column" (or "second row"), "third column" (or "third row"), etc. Further, the term "first image element" needs not refer to the very first image element in a line within an imager, and it may be used to refer to any of the image elements in a line. The same applies with respect to the terms "second image element," "third image element," etc.

Although particular embodiments have been shown and described, it will be understood that they are not intended to limit the present inventions, and it will be obvious to those skilled in the art that various changes and modifications may be made without departing from the spirit and scope of the present inventions. For example, the operations performed by the processor/module can be performed by any combination of hardware and software, and should not be limited to particular embodiments comprising a particular definition of "processor". The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. An imaging system, comprising:
    a first image element in a first row;
    a second image element in the first row;
    a third image element in a second row, the third image element and the first image element being in a first column;
    a gate driver;
    a first electrical line extending from the gate driver, wherein the first and the second image elements are electrically coupled to the first electrical line;
    a second electrical line, wherein the first image element is electrically coupled to the second electrical line; and
    a third electrical line, wherein the third image element is electrically coupled to the third electrical line;
    wherein the first electrical line is electrically coupled to the third image element in the second row.

2. The imaging system of claim 1, wherein the third image element is spaced apart from the first image element such that one or more additional image element is located therebetween.

3. The imaging system of claim 2, wherein the one or more additional image element comprises three additional image elements located consecutively in the first column.

4. The imaging system of claim 2, wherein the one or more additional image element comprises a fourth image element in a third row.

5. The imaging system of claim 4, further comprising circuitry for generating a control signal that causes the gate driver to access respective image signals from the first and the fourth image elements simultaneously.

6. The imaging system of claim 4, further comprising an amplifier connected to the second electrical line for selectively either receiving a signal from one of the first and the fourth image elements, or receiving a signal derived from signals from both of the first and the fourth image elements.

7. The imaging system of claim 4, wherein the gate driver is configured to cause a first signal from the first image element and a second signal from the fourth image element be collected via the second electrical line.

8. The imaging system of claim 7, wherein the gate driver is configured to cause the first and the second signals be collected simultaneously.

9. The imaging system of claim 7, wherein the gate driver is configured to cause the first and the second signals be collected one after another.

10. The imaging system of claim 9, further comprising a processor for generating an image using the first and the second signals, wherein one of the first and the second signals forms a first point of the image, and another of the first and the second signals forms a second point of the image.

11. The imaging system of claim 1, wherein at least a portion of the second electrical line is approximately perpendicular to the first electrical line, and at least a portion of the third electrical line is approximately perpendicular to the first electrical line.

12. The imaging system of claim 1, further comprising a first amplifier connected to an end of the second electrical line, and a second amplifier connected to an end of the third electrical line.

13. The imaging system of claim 1, further comprising a first connecting pad connected to an end of the second electrical line, and a second connecting pad connected to an end of the third electrical line.

14. The imaging system of claim 1, wherein the first image element generates a signal in response to light photons.

15. The imaging system of claim 1, wherein the first image element generates a signal in response to radiation.

16. The imaging system of claim 1, further comprising circuitry for generating a control signal that causes the gate driver to access respective image signals from the first and the third image elements simultaneously.

17. The imaging system of claim 1, wherein the second electrical line is electrically connected to only a subset of image elements in the first column, the subset of image elements including the first image element.

18. The imaging system of claim 1, wherein the second electrical line is configured to deliver signal from the first image element to a first node, and the third electrical line is configured to deliver signal from the third image element to a second node, so that the signals from the first and third image elements remain separated after they are collected.

19. A control module configured for:
    generating a control signal to access a first image signal from a first image element, a second image signal from a second image element, and a third image signal from a third image element;
    wherein the first image element and the third image element are located in a first row, the second image element is located in a second row, the first and the second image elements are located in a column, the first image element is connected to a first electrical line for transmitting the first image signal, and the second image element is connected to a second electrical line for transmitting the second image signal.

20. The control module of claim 19, further configured for generating a control signal to access a fourth image signal from a fourth image element located in the first column, the fourth image being between the first and the second image elements.

21. The control module of claim 20, further comprising a node for combining the first image signal from the first image element and the fourth image signal from the fourth image element to form an aggregate signal.

22. The control module of claim 20, further comprising a processor for generating an image using the first image signal from the first image element and the fourth image signal from the fourth image element, wherein the first image signal forms a first point of the image, and the fourth image signal forms a second point of the image.

23. The control module of claim 20, further comprising circuitry for allowing the first and the fourth image signals be selectively collected either simultaneously, or one after another.

24. The control module of claim 19, wherein the first electrical line is connected to a first amplifier, and the second electrical line is connected to a second amplifier.

25. The control module of claim 19, wherein the first electrical line has a first end connected to a first node, and the second electrical line has a second end connected to a second node, such that the first and second image signals received at the respective first and second nodes remain separated after they are collected.

26. The control module of claim 19, wherein the first electrical line is electrically connected to only a subset of image elements in the column, the subset of image elements including the first and second image elements.

27. The control module of claim 19, further comprising a gate driver, wherein the first image element in the first row is coupled to the gate driver through a gate line, the gate line connecting to another image element in another row that is different from the first row.

28. A method for collecting image signals, comprising:
accessing a first image signal from a first image element in a first row and a second image signal from a second image element in a second row, wherein the first and the second image elements are located in a column; and
accessing a third image signal from a third image element in the first row;
wherein the first, second, and third image signals are accessed simultaneously, the first image signal is accessed using a first electrical line, and the second image signal is accessed using a second electrical line;
wherein the first electrical line has a first end connected to a first node, and the second electrical line has a second end connected to a second node, such that the first and second image signals received at the respective first and second nodes remain separated after they are collected.

29. A method for collecting image signals, comprising:
accessing a first image signal from a first image element in a first row and a second image signal from a second image element in a second row, wherein the first and the second image elements are located in a column; and
accessing a third image signal from a third image element in the first row;
wherein the first, second, and third image signals are accessed simultaneously, the first image signal is accessed using a first electrical line, and the second image signal is accessed using a second electrical line;
wherein the first electrical line is electrically connected to only a subset of image elements in the column, the subset of image elements including the first and second image elements.

30. A method for collecting image signals, comprising:
accessing a first image signal from a first image element in a first row and a second image signal from a second image element in a second row, wherein the first and the second image elements are located in a column; and
accessing a third image signal from a third image element in the first row;
wherein the first, second, and third image signals are accessed simultaneously, the first image signal is accessed using a first electrical line, and the second image signal is accessed using a second electrical line;
wherein the first image element in the first row is coupled to a gate driver through a gate line, the gate line connecting to another image element in another row that is different from the first row.

31. An imaging system, comprising:
a plurality of rows of image elements;
a gate driver;
a first gate line extended from the gate driver, wherein the first gate line is electrically connected to every Nth one of the rows of image elements; and
a first node for receiving a first image signal from a first image elements in one of the rows.

32. The imaging system of claim 31, wherein each of the image elements is configured to generate a signal in response to light photons.

33. The imaging system of claim 31, wherein each of the image elements includes a portion of a conversion panel and a portion of a photo detector array.

34. The imaging system of claim 31, wherein Nth=2nd.

35. The imaging system of claim 31, wherein Nth=4th.

36. The imaging system of claim 31, wherein Nth=8th.

37. The imaging system of claim 31, wherein the first gate line is electrically connected to only every Nth one of the rows of image elements.

38. The imaging system of claim 31, wherein the gate driver is configured to cause image signals from the image elements that are in the every Nth one of the rows to be collected simultaneously.

39. The imaging system of claim 31, further comprising a second gate line extended from the gate driver, wherein the second gate line is electrically connected to every Nth one of the rows of image elements, wherein the every Nth one of the rows of image elements connected to the second gate line are adjacent to the respective Nth one of the rows of image elements connected to the first gate line.

40. The imaging system of claim 39, further comprising an input for allowing a user to determine whether to activate the first and second gate lines simultaneously or sequentially.

41. The imaging system of claim 31, further comprising a second node for receiving a second image signal from a second image element in another one of the rows.

42. The imaging system of claim 41, wherein the first and second image elements are in a same column.

43. The imaging system of claim 42, wherein the gate driver is configured to cause the first and second image signals to be collected at the respective first and second nodes simultaneously.

* * * * *